(12) United States Patent
Sigler et al.

(10) Patent No.: US 10,335,892 B2
(45) Date of Patent: Jul. 2, 2019

(54) WELD ELECTRODE FOR ATTRACTIVE WELD APPEARANCE

(71) Applicant: GM GLOBAL TECHNOLOGY OPERATIONS LLC, Detroit, MI (US)

(72) Inventors: David R. Sigler, Shelby Township, MI (US); James G. Schroth, Troy, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 793 days.

(21) Appl. No.: 14/556,713

(22) Filed: Dec. 1, 2014

(65) Prior Publication Data

US 2015/0083694 A1 Mar. 26, 2015

Related U.S. Application Data

(63) Continuation of application No. 12/251,635, filed on Oct. 15, 2008, now Pat. No. 8,927,894, which is a continuation-in-part of application No. 11/536,001, filed on Sep. 28, 2006, now Pat. No. 8,436,269.

(51) Int. Cl.
*B23K 11/00* (2006.01)
*B23K 11/30* (2006.01)
*B23K 11/11* (2006.01)
*B23K 11/18* (2006.01)

(52) U.S. Cl.
CPC ......... *B23K 11/3009* (2013.01); *B23K 11/115* (2013.01); *B23K 11/185* (2013.01); *C21D 2251/04* (2013.01)

(58) Field of Classification Search
CPC ..... B23K 11/30; B23K 11/3009; B23K 11/00; B23K 11/3081; B23K 11/14; B23K 11/309
USPC ....... 219/119, 86.1, 91.2, 91.21, 78.1, 117.1, 219/118, 85.16
See application file for complete search history.

(56) References Cited

U.S. PATENT DOCUMENTS

| | | | |
|---|---|---|---|
| 1,303,919 A | 5/1919 | Lachman | |
| 2,379,187 A | 6/1945 | Richards | |
| 2,641,670 A | 6/1953 | Graves, Jr. | |
| 3,689,731 A | 9/1972 | Miller | |
| 3,820,437 A | 6/1974 | Dyer et al. | |
| 4,588,870 A | 5/1986 | Nadkarni et al. | |
| 4,591,687 A | 5/1986 | Urech | |
| 4,610,153 A | 9/1986 | Nedorezov | |
| 5,015,816 A | 5/1991 | Bush et al. | |

(Continued)

*Primary Examiner* — Dana Ross
*Assistant Examiner* — Ayub A Maye
(74) *Attorney, Agent, or Firm* — Reising Ethington P.C.

(57) ABSTRACT

A welding electrode for use in resistance spot welding an assembly of overlying metal workpieces that includes an aluminum alloy workpiece is disclosed. The welding electrode includes a body, a convex weld face at one end of the body, and ringed protrusions that project outwardly from the convex weld face. The ringed protrusions are positioned to make contact with, and indent into, a surface of the aluminum alloy workpiece when the convex weld face is pressed against the aluminum alloy workpiece during a spot welding event. When brought into contact with the surface of the aluminum alloy workpiece, the ringed protrusions disrupt the oxide film present on the aluminum alloy workpiece surface, which improves the spot welding process.

20 Claims, 4 Drawing Sheets

(56) References Cited

U.S. PATENT DOCUMENTS

| | | |
|---|---|---|
| 5,155,320 A | 10/1992 | Simmons |
| 5,304,769 A | 4/1994 | Ikegami et al. |
| 5,844,194 A | 12/1998 | Kuwabara et al. |
| 5,951,888 A | 9/1999 | Oakley |
| 6,037,559 A | 3/2000 | Okabe et al. |
| 6,191,516 B1 * | 2/2001 | Froehlich ............... H02K 1/17 310/156.12 |
| 6,322,296 B1 | 11/2001 | Wetli et al. |
| 6,806,436 B2 * | 10/2004 | Katou ................. B23K 11/11 219/86.9 |
| 6,861,609 B2 | 3/2005 | Sigler |
| 7,249,482 B2 | 7/2007 | Chen |
| 8,222,560 B2 | 7/2012 | Sigler et al. |
| 8,274,010 B2 | 9/2012 | Sigler et al. |
| 8,350,179 B2 | 1/2013 | Schroth et al. |
| 8,436,269 B2 | 5/2013 | Sigler et al. |
| 8,525,066 B2 | 9/2013 | Sigler et al. |
| 8,833,215 B2 | 9/2014 | Sigler et al. |
| 8,927,894 B2 | 1/2015 | Sigler et al. |
| 2003/0116539 A1 | 6/2003 | Wile et al. |
| 2005/0211677 A1 * | 9/2005 | Chen ................. B23K 11/115 219/117.1 |
| 2006/0081563 A1 | 4/2006 | Ueda et al. |
| 2010/0258536 A1 | 10/2010 | Sigler et al. |
| 2013/0015164 A1 | 1/2013 | Sigler et al. |
| 2013/0048613 A1 | 2/2013 | Sigler et al. |
| 2013/0168367 A1 | 7/2013 | Sigler et al. |
| 2013/0200048 A1 | 8/2013 | Sigler et al. |

* cited by examiner

WELD ELECTRODE FOR ATTRACTIVE WELD APPEARANCE

CROSS-REFERENCE TO RELATED APPLICATIONS

This application is a continuation of application Ser. No. 12/251,635, filed Oct. 15, 2008, which is continuation-in-part of application Ser. No. 11/536,001, filed Sep. 28, 2006, now U.S. Pat. No. 8,436,269. The text and drawings of application Ser. Nos. 11/536,001 and 12/251,635 are incorporated herein by reference in their entireties.

TECHNICAL FIELD

This invention pertains to electrodes for the formation of electrical resistance spot welds between two or more sheet metal layers. More specifically this invention pertains to welding electrodes for forming of high quality weld nuggets between the metal layers and for simultaneously forming a pleasing pattern or image at the position where the welding electrode contacts the surface.

BACKGROUND OF THE INVENTION

The above identified parent application describes welding electrodes with a round weld face for contact with a metal workpiece in an electrical resistance welding operation. The weld face includes concentric rings of ridges and/or grooves extending radially from the center of the weld face; the ridges extending axially upwardly from the face and the grooves extending inwardly into the face. When the face of the electrode is pressed into contact with a surface of the metal workpiece for delivery of a welding current, these shaped features on the face of the electrode penetrated surface oxides or other conductivity barriers to facilitate passage of a welding current.

Current automotive vehicle manufacturing operations include, for example, the joining of two sheet metal layers by spot welding. Vehicle body panels such as doors, hoods, deck lids and liftgates are often assembled by joining inner and outer panels stamped from sheet metal of suitable metal alloys. Ferrous or aluminum alloys are often used. The thickness of each sheet metal layer may vary from less than one millimeter to more than four millimeters. Electrical resistance spot welding is often used to join such inner and outer panels or other metal parts. For example, an edge of an outer panel sheet may be folded over a complementary edge of an inner panel sheet in an assembly of the panels in which the hem(s) is at the periphery of the sheets. The panel assembly is positioned for welding in areas removed from the hem joint. Axially aligned and opposing electrodes are pressed toward each other against opposite sides of the panel assembly. A momentary welding current is passed between the electrodes through the layers of metal to form a spot weld. The spot weld is characterized by a momentarily fused pool of metal and a re-solidified weld nugget at the interface of the contacting sheets. The electrodes are retracted and moved to another weld site. The welding electrodes of the parent application with concentric features on their welding faces form high quality welds in metal workpieces.

In some applications spot weld sites may be visible in the surface of a finished product such as an automotive vehicle body panel or member. Several types of joints are used to join sheet metal panels in areas that may be visible to customers. These areas include joints formed on vehicle body closure members such as hoods, decklids, liftgates, and doors. Visible joints in the vehicle structure also include those in the engine compartment and trunk. It has been observed that the welding electrodes of the parent application not only form strong durable spot welds in such welded articles, but the circular ridges or grooves leave a faithful impression on a visible surface of a spot weld site. The clear visible ring pattern in the surface of the welded assembly is found to be much more pleasing to a consumer than the traditionally formed welding electrode impression. Such a pleasing weld appearance can also influence the perceived quality of the assembly, that is, the appearance details alone can influence the consumer's perception as to whether a product will fulfill his or her expectations. And where a progressive sequence of such weld sites is visible, the suggestion of high quality is reinforced.

Resistance spot weld appearance can suffer from several undesirable features when using current, conventional spot weld electrodes. For example, a domed electrode with a flat welding face machined in its center is widely used for spot welding steel. It tends to leave a sharp imprint on the sheet surface that can have excessive indentation especially if the electrode engages the sheet surface in an off-normal orientation when forming a spot weld. The electrode shape is also prone to causing sheet deformation around the weld that is unattractive. Metal expulsion from excessive heat and off-normal orientation can lead to whiskers or fingers of metal protruding from the sheet surface which is undesirable.

Such welding surface issues have not arisen when using the electrodes of the parent application. So it is an object of this invention to provide additional welding electrode face features that assure the formation of high strength or structural spot welds in workpieces, such as steel and aluminum sheet metal workpieces, while leaving behind clear visible indicia in a weld surface that provides an attractive appearance.

SUMMARY OF THE INVENTION

This invention is a method to improve resistance spot weld appearance by introducing visible features on the joint's visible surface. The appearance is controlled by using an electrode shape that deliberately imparts a selected design on (or into) the sheet surface by taking advantage of the heat and pressure used during the spot welding operation. Shaped features are incorporated in at least one of the opposing electrode welding faces that contacts at least one of the outer sheet metal surfaces. These shaped features on the electrode face contribute to the formation of a suitable spot weld and leave an impressed image in the weld surface. The image may be formed using either a protrusion extending from the weld face surface, an intrusion into the weld face surface, or a combination of protrusions and intrusions. The image may be in the form of lines, geometric figures, alphanumeric symbols, or other recognizable and distinguishable images, such as a trademarked logo. The formation of such a discernable image provides an attractive appearance, but is not necessarily indicative of the underlying weld strength.

In the making of resistance spot welds between overlying sheet layers a weld nugget is formed at the interface of the sheets. The diameter of the weld nugget is typically smaller than the diameter of the weld face of the electrode so the image on the sheet surface at the weld site is not limited to the size or precise location of the weld nugget.

Formation of the selected design during the welding process may differ somewhat depending on whether the welded material is an aluminum alloy or steel material. For the case of aluminum alloy material, the protrusion/intrusion on the electrode face forms the design in the material surface by reforming the aluminum alloy surface under the elevated temperature and pressure that is produced during the spot welding process. Aluminum alloys are good conductors of heat and electrical current. These attributes produce a softened zone around the weld nugget and at the sheet surface which can be deformed into the desired design. Since the softened zone extends well beyond the formed nugget, the design can also extend well beyond the nugget perimeter.

Formation of the selected design in steel materials may be somewhat different. The higher thermal and electrical resistivity of steel, along with its high melting point, makes it somewhat more difficult to form a design in the sheet surface with commonly used copper electrode materials. However, nearly all steel materials used within automotive vehicle bodies are coated with a layer of zinc or zinc-iron. During the traditional spot welding process, this zinc layer is typically melted early in the welding process and displaced from beneath the electrode by hydraulic pressure. If an electrode is used with a design in the surface, the molten zinc may be trapped within the design so that it is not fully displaced from beneath the welding electrode. Provided that the electrode temperature does not exceed the boiling point of zinc or zinc-iron, once weld current is stopped, the molten zinc or zinc-iron re-solidifies taking the shape of the electrode surface. The design is then incorporated by a combination of sheet deformation and "re-casting" of the surface zinc. Since the design is partially formed by recasting zinc, which requires a low temperature to melt, the design can extend well beyond the nugget perimeter where sheet metal is colder and more difficult to form.

In each welding application, the electrode face is sized and shaped to form a good weld at the interfacial surfaces of contacting sheet surfaces, i.e., the faying interface. And the electrode faces are shaped to leave a corresponding pattern of intrusions and/or protrusions in the welded surface that are intended to suggest to a viewer that the image in the surface indicates that a predetermined and suitable high quality weld has been formed. In order to produce an observable feature in the welded surface(s) it is preferred that protrusions or intrusions on the electrode faces have a minimum height/depth of about ten microns. As is described below in this specification the protrusions/intrusions may be larger depending on the thicknesses of the workpieces to be welded.

Accordingly, one aspect of the present invention is in the design of the face of an electrical resistance welding electrode to affect good welds and leave a desired surface image. And another aspect of the invention is in the method of using such electrodes to form spot welds in metal workpieces, particularly in surfaces of workpieces that are visible to a user of the welded article.

Other objects and advantages of the invention will be apparent from a description of illustrative embodiments which follows in this specification.

DESCRIPTION OF PREFERRED EMBODIMENTS

One or more protrusion and/or intrusion elements are conceived, determined, and formed on the weld face of an electrical resistance spot weld electrode. These elements serve to suitably engage a sheet surface to be welded to form a suitable spot weld nugget between the contacting sheet surfaces. But the elements also are shaped to provide an attractive appearance when viewed by an observer.

Accordingly, the protrusions and/or intrusions must meet a combination of requirements. First, excessive indentation of the sheet material is to be avoided. Excessive indentation or metal thinning may weaken the weld and/or surrounding sheet metal. For a weld consisting of two or more sheets, indentation occurs on the outer surfaces of the two outermost sheets. The amount of indentation is typically more important for the thinner of the two sheets, since any given level of indentation makes up a larger portion of the thickness of the thinner sheet. In all cases of aluminum and steel welding, the indentation in the outer two sheet surfaces should not be greater than 50% of the sheet thickness. Preferably for aluminum spot welding, since aluminum is more notch sensitive than steel, the amount of indentation should not exceed 20% of the sheet thickness. In both cases, a preferred level of indentation would be about 15% or less of the sheet thickness since this would have a minimal effect on weld durability. Even a 1% indentation of a typical sheet thickness can leave a pattern that is visible to the human eye.

Figure 1A:
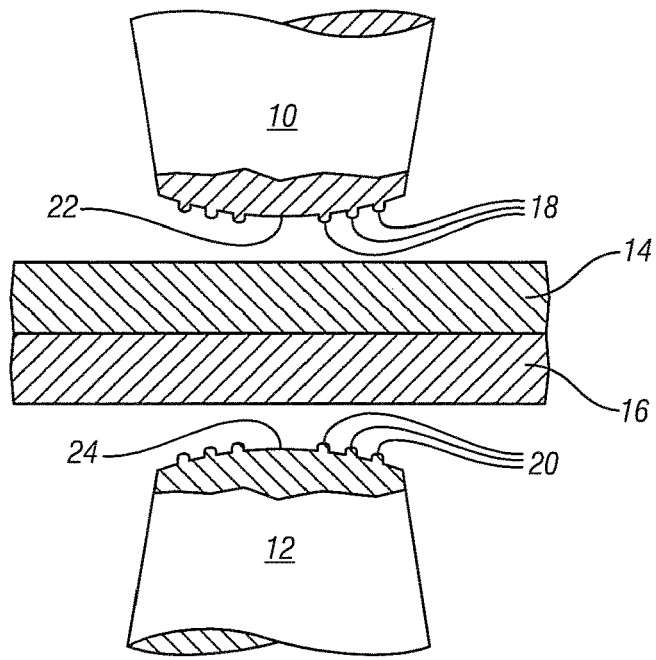
FIG. 1A is a side elevation, schematic view, partly in cross-section, of the weld face portions of a pair of opposing, axially aligned resistance welding electrodes about to engage portions of two overlapping aluminum alloy sheets to form an electrical resistance spot weld. The electrode faces have protrusions for forming a pattern of grooves in the engaged surfaces of the aluminum sheets.

FIG. 1A is a fragmentary schematic illustration of the opposing electrical resistance spot weld electrodes 10, 12 poised for engagement with an assembly of overlapping aluminum sheets 14, 16. Groupings of three concentric circular protrusions 18 on the face 22 of electrode 10 and three like concentric circular protrusions 20 on the face 24 of electrode 12 have been machined on the spherically curved welding faces 22, 24.

Electrodes for resistance spot welding are typically formed of copper or low resistivity copper alloys. They typically have a round body with a shank portion that is secured in a weld gun mounted on a robot or other welding apparatus for conducting a suitable welding current to the electrodes and for locating them in opposing axial alignment against opposite outer faces of a sheet metal assembly in which one or more welds are to be formed. As illustrated in FIG. 1A and several of the other drawing figures, the end of the electrodes 10, 12 may be tapered, for example in the shape of a truncated cone or a truncated sphere, to a flat or rounded welding face. In the illustrative embodiments of this invention the welding faces (22, 24 in FIGS. 1A and 1B) are spherically rounded, suitably with a radius of for example about 20 mm to about 50 mm, for easier engagement with a less-then-perfectly aligned workpiece surface.

The protrusions may be in the configuration of concentric circles, concentric squares or other geometric shapes. The protrusions may be parallel lines, or alphanumeric letters or numerals, or other meaningful one dimensional or two dimensional indices. In the FIGS. 1A and 1B embodiment of the invention, the protrusions 18, 20 are in the form of three concentric circles that extend outwardly from the rounded face 22, 24 of each electrode 10, 12. But in some embodiments it may be desired to employ the protrusions only on an electrode face that engages a surface of a workpiece that may be visible to a user of a finished welded article. The sides of the protrusions 18, 20 are preferably tapered toward the end (as illustrated in FIG. 1A and FIG. 1B) so that they may enter into a softened aluminum alloy surface without bonding to it (as is described in more detail below).

Figure 1B:
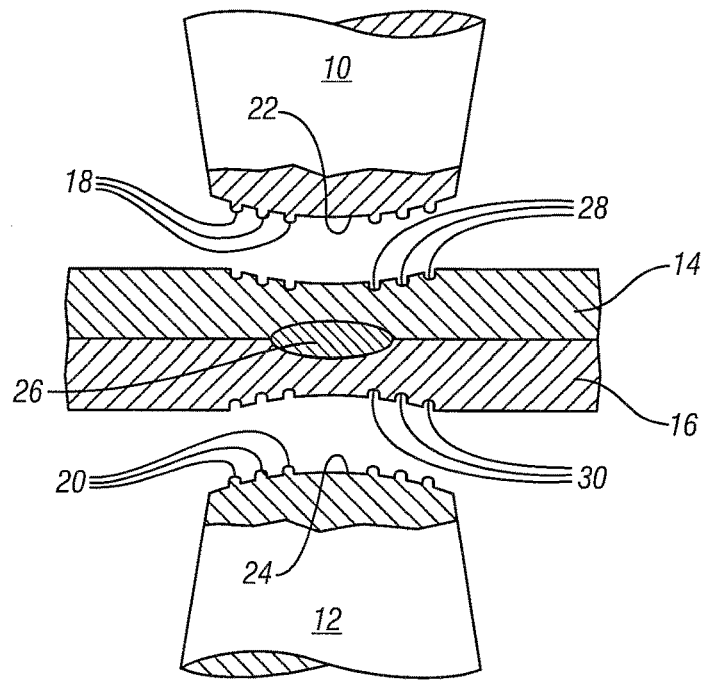
FIG. 1B shows the electrodes in a withdrawn position after they have engaged the aluminum sheets and formed a weld nugget at the interface of the sheet surfaces. The outer surfaces of the aluminum sheets are deformed by the protrusions on the electrode faces.

In FIG. 1B the electrode faces have engaged the outer surfaces of the overlying aluminum alloy sheet workpieces to form a spot weld and then been withdrawn. In forming the weld, a welding current was passed between the electrodes to heat a generally cylindrical path through the overlying sheets. A molten metal pool is momentarily formed at the interface of the sheets 14, 16 which loses heat to the surrounding metal and re-solidifies as a weld nugget 26 that contains metal from both sheets 14, 16 and joins them at the welded spot. The rounded electrode faces 22, 24 with their respective protrusions 18, 20 have deformed the momentarily heat softened outer aluminum sheet surfaces to form and leave attractive patterns 28, 30 of three concentric rings embossed in the outer surfaces of the now spot welded workpieces 14, 16.

Figure 2A:
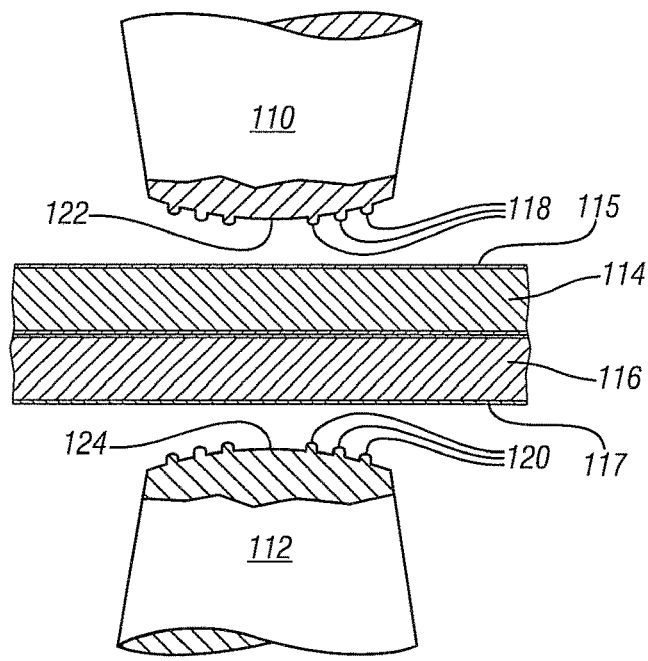
FIG. 2A is a side elevation, schematic view, partly in cross-section, of the weld face portions of a pair of opposing, axially aligned resistance welding electrodes about to engage portions of two overlapping zinc-coated steel alloy sheets to form a resistance spot weld. The electrode faces have protrusions for forming grooves in the engaged surfaces of the zinc-coated steel sheets.
Figure 2B:
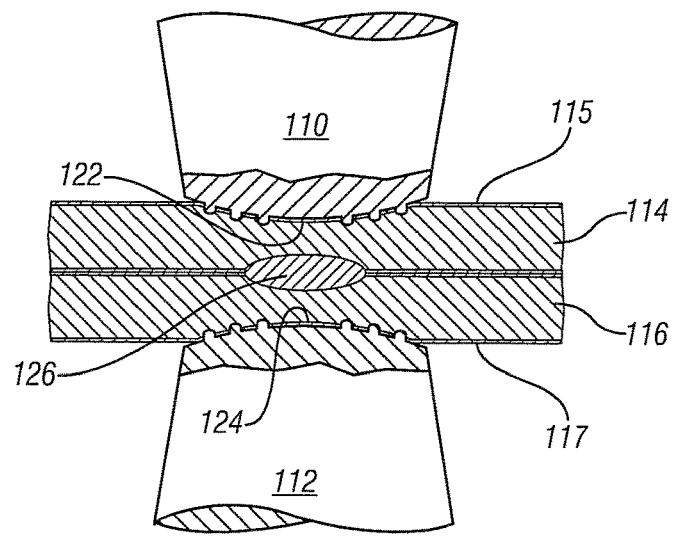
FIG. 2B shows the electrodes engaging and penetrating through the zinc coating on the steel sheets and forming a weld nugget at the interface of the sheet surfaces. The outer surfaces of the steel sheets are slightly deformed by the protrusions on the electrode faces.

FIGS. 2A and 2B illustrate the use of like or similar opposing welding electrodes 110, 112 to form a spot weld in an assembly of overlying zinc-coated steel sheet workpieces 114, 116 (with zinc coatings 115, 117). FIG. 2A shows the axially aligned and opposing electrodes 110, 112 with their rounded faces 122, 124 and tapered and rounded protrusions 118, 120 ready to engage a predetermined welding site on the assembled sheets 114, 116. In FIG. 2B the electrodes 110, 112 are shown in engagement with the welding surfaces and formed the weld nugget 126 between the contacting sheets 114, 116. In this illustration there has been less deformation of the steel sheets. But the zinc coating layers 115, 117 (which may be several micrometers thick) have been deformed and recast in the moderately deformed steel surfaces to leave embossed patterns in the respective outer surfaces of workpieces 114, 116. As in the embodiment illustrated in FIG. 1B, the embossed patterns will substantially be the negative shapes of protrusions 118, 120.

Figure 3:
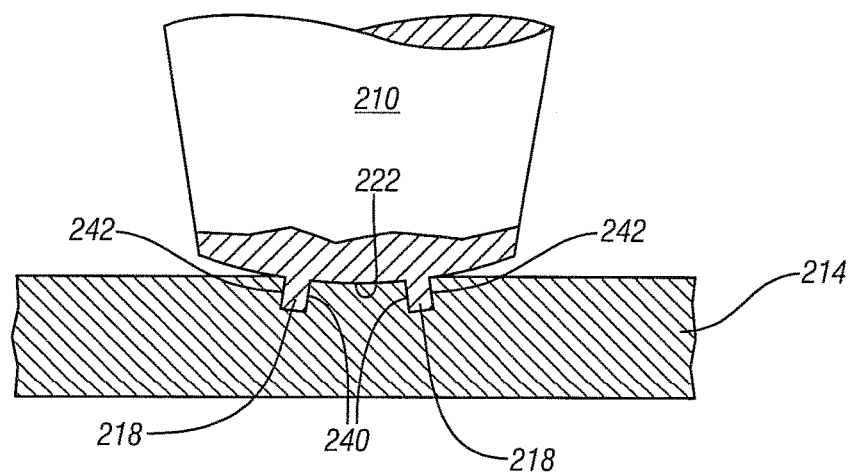
FIG. 3 illustrates in cross-section an unsuitable protrusion electrode face shape with an entry angle such that the protrusion could become joined to a sheet surface. In this illustration the sheet surface is an aluminum alloy sheet surface.
Figure 4:
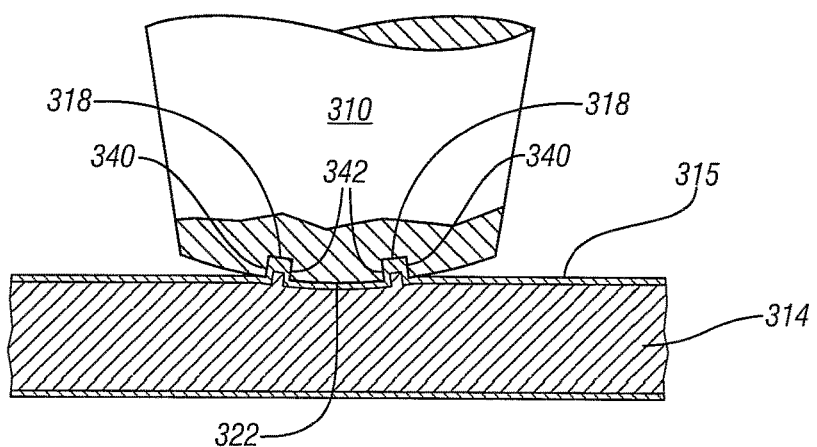
FIG. 4 illustrates in cross-section an unsuitable intrusion electrode face shape with an entry angle such that the intrusion could become joined to extruded material from a sheet surface. In this illustration the sheet surface is a zinc-coated steel alloy sheet surface.

A second requirement of the protrusion/intrusions is that they not cause excessive sticking between the electrode and sheet stack-up. Excessive sticking can cause serious problems in production environments. FIGS. 3 and 4 illustrate examples where the protrusions and intrusions on an electrode welding face may cause the electrode to become joined to the deformed sheet surface. FIG. 3 illustrates spot weld electrode 210 with welding face 222 and its angled protrusions 218 engaging and penetrating a surface of aluminum sheet workpiece 214. Protrusions 218 are not tapered and engage the surface of aluminum sheet 218 at an angle displaced from a vertical angle. Similarly, in FIG. 4, spot weld electrode 310 with welding face 322 and its angled intrusions 318 engaging a surface of a steel sheet 314 with its zinc coating layer 315. In this example workpiece metal enters the intrusions 318 machined in the weld face 322 of electrode 310. While in spot welding operations two electrodes and welding surfaces are typically involved, in both FIGS. 3 and 4, a single welding electrode and sheet are shown to illustrate the angles of engagement of the respective protrusions or intrusions with a workpiece surface.

The shape of the protrusions (e.g., 218 in FIG. 3) or intrusions (e.g., 318 in FIG. 4) produces contact angles with the workpieces 214 and 314, 315 that tend to lock the electrode face to the workpiece surface. In both cases the angle between the exterior surface of the sidewalls of the protrusion/intrusion and the plane of the sheet surface must be controlled such that 1) protrusions do not become irreversibly imbedded in the sheet surface and 2) intrusions do not result in the entrapment of deformed sheet metal and/or molten zinc. To accomplish this, the angle between any protrusion sidewall and the sheet surface must be less than 90 degrees while the angle between any intrusion sidewall and the sheet surface must also be less than 90 degrees. This is illustrated in FIGS. 3 and 4. In FIG. 3 protrusion surfaces 240 have preferred contact angles and protrusion surfaces 242 have non-preferred contact angles. In FIG. 4 intrusion surfaces 340 have preferred contact angles and intrusion surfaces 342 have non-preferred contact angles. In the non-preferred angles it is seen that when an electrode is withdrawn the hot soft metal would tend to pulled against the protrusion or intrusion of the electrode face.

The desired (or preferred) angles should not be too close to perpendicular to the workpiece surface, 90 degrees, (e.g. <87 degrees) since walls vertical to the sheet surface might promote sticking. In addition, sharp corners in the protrusion/intrusions may promote sticking, rounded corners would be preferred.

A third requirement is that the electrode weld face is shaped with protrusion and/or intrusion features to allow it to perform its primary function, i.e., produce structural welds in the sheet material. Excessively deep intrusions and especially protrusions on the electrode surface may possibly have deleterious effects on weld formation. Electrode weld faces, and particularly those designed to spot weld aluminum, are designed to control the current density during the welding process. Radiused electrode weld faces are used to provide a high initial current density by providing a small contact area between the sheet surface and electrode. Compromising this area by placing intrusions on the weld face should have a small effect as long as most of the contacting area is left unmodified. No more than 50% of the contacting area should be modified by intrusions; preferably this should be less than 20%. Protrusions, however, will make contact with the sheet before the remainder of the weld face. This can dramatically alter the initial current density during the welding process. Intentional programming of low initial current levels may be required for some geometries to prevent overheating of the protruding electrode features. Once the protrusions have heated the sheet locally and penetrated the surface, normal welding currents can be used. The amount of area modified by the protrusions should be similar to that for intrusions, at most 50% of the initial contact area and preferably less than 20%.

In order to produce a visible feature in the welded surface the protrusions may require a minimum height of about ten microns above the face of the electrode. Similarly, intrusions in the face of an electrode may require a minimum depth of about ten microns. These height and depth dimensions may be larger depending on the thicknesses of the workpieces as described above.

The formation of attractive weld surfaces must not compromise structural weld integrity. Structural weld quality is determined by the welding parameters of force, time, and current, but is also closely linked to the geometry of the electrode weld face. Electrode weld faces are typically either flat or convex for welding of both steel and aluminum. For steel welding the electrode weld face should be a minimum of 10% greater than the target weld size which is $4\times(t)^{1/2}$ where t is the governing metal thickness, i.e., the thinner sheet in a two-stack weld. The weld face can be as large as the diameter of the electrode, which typically varies from about 12 mm to about 20 mm. Curvature of the weld face can vary dramatically from flat to 6 mm in radius. Smooth-faced electrodes are typically used for steel spot welding. For aluminum spot welding the electrode weld face should be a minimum of 20% greater than the target weld size of $4\times(t)^{1/2}$ where t is the governing metal thickness. The weld face can be as large as the diameter of the electrode, which varies from about 16 mm to about 19 mm. Curvature of the weld face is more limited. It can vary from flat to a 50 mm radius of curvature for smooth-faced electrodes, i.e., roughness of less than 1 micron. For textured electrodes with a surface roughness greater than 1 micron and preferably greater than 5 microns the radius of curvature can vary from flat to 20 mm.

For spot welding of both aluminum alloys and steel materials, electrodes with flat weld faces leave indentations on the surface of the sheet that have a flat central region. If this region is not aligned carefully with the rest of the sheet then it appears off-angle and can degrade perceived quality. To prevent this from occurring, electrodes with radiused weld faces are preferred for producing high perceived quality welds. These would produce imprints with an overall dish-shaped appearance in the material.

Figure 5:
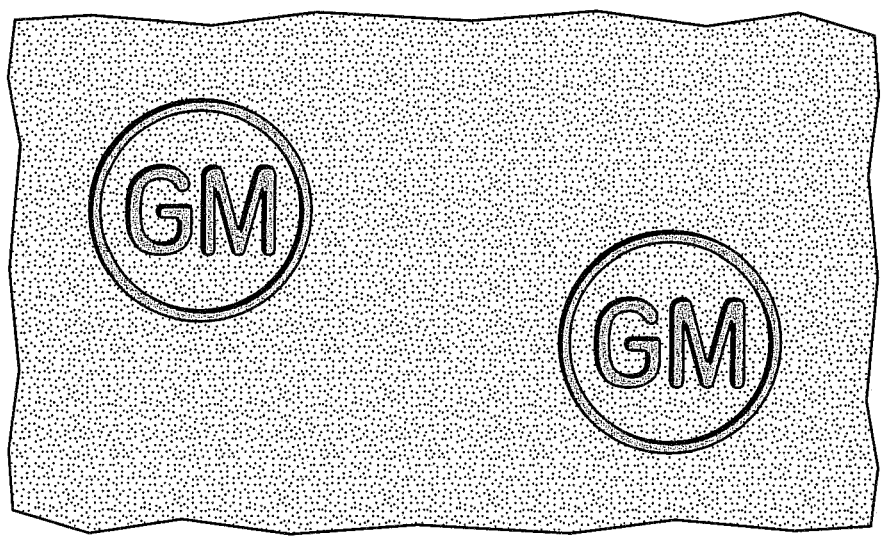
FIG. 5 illustrates a surface of a workpiece in which the letters "GM" have been formed at weld sites by intrusions in the weld face of an electrode.

An example of high perceived quality welds formed in zinc coated steel sheet are shown in FIG. 5. In this example the mirror images of the letters "GM" were formed as intrusions on the face of a welding electrode and used in forming a sequence of two spot welds.

Figure 6:
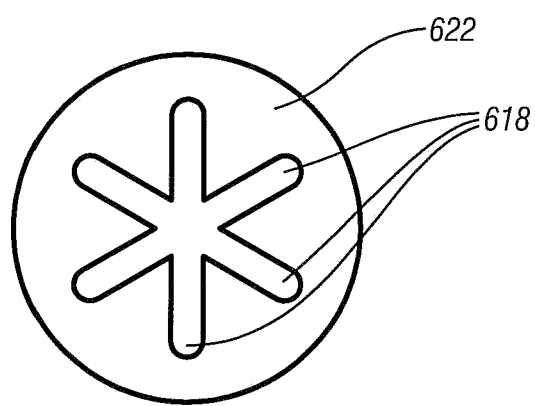
FIG. 6 illustrates a protrusion or intrusion design for a weld face for forming the image of a snow flake or star in a welded surface.

FIG. 6 illustrates a weld electrode face 622 with protrusions 618 in the shape of a snow flake or star.

Practices of the invention have been disclosed in term of some illustrative embodiments which are not intended to limit the scope of the invention.

The invention claimed is:

1. A welding electrode comprising: a body of the welding electrode, which welding electrode forms electrical resistance spot welds in an assembly of overlying metal workpieces that comprises at least one aluminum alloy workpiece, the body having an end; a convex weld face supported at the end of the body; and ringed protrusions that project outwardly from the convex weld face and are positioned to make contact with and indent into a surface of the aluminum alloy workpiece when the convex weld face of the welding electrode is brought into contact with the assembly of overlying sheet metal workpieces during a resistance spot welding operation, the ringed protrusions being radially spaced from one another on the convex weld face and each of the ringed protrusions having a circumference that surrounds a center of the convex weld face, wherein each of the ringed protrusions has rounded corners when viewed in cross-section, and wherein an innermost ringed protrusion of the ringed protrusions rises to a height above a portion of the convex weld face surrounded by the innermost ringed protrusion.

2. The welding electrode set forth in claim 1, wherein the convex weld face is spherically rounded and has a radius of curvature between 20 mm and 50 mm.

3. The welding electrode set forth in claim 1, wherein the welding electrode is formed of a copper alloy.

4. The welding electrode set forth in claim 1, wherein an amount of area of the convex weld face modified by the ringed protrusions is 50% or less of a contacting area of the convex weld face.

5. The welding electrode set forth in claim 1, wherein each of the ringed protrusions protrudes above the convex weld face to a height of at least 10 μm.

6. The welding electrode set forth in claim 2, wherein the ringed protrusions concentrically surround the center of the convex weld face and are separated by concentric circular sloped portions of the convex weld face.

7. The welding electrode set forth in claim 4, wherein the amount of area of the convex weld face modified by the ringed protrusions is 20% or less of a contacting area of the convex weld face.

8. A welding electrode comprising: a body of the welding electrode, which welding electrode forms electrical resistance spot welds in an assembly of overlying metal workpieces that comprises at least one aluminum alloy workpiece, the body having an end; a spherically rounded weld face supported at the end of the body, the spherically rounded weld face having a radius of curvature between 20 mm and 50 mm; and ringed protrusions that project outwardly from the spherically rounded weld face and are positioned to make contact with and indent into a surface of the aluminum alloy workpiece when the spherically rounded weld face of the welding electrode is brought into contact with the assembly of overlying sheet metal workpieces during a resistance spot welding operation, the ringed protrusions being radially spaced from one another on the spherically rounded weld face, wherein each of the ringed protrusions having a circumference that surrounds a center of the spherically rounded weld face, and wherein an innermost ringed protrusion of the ringed protrusions rises to a height above a portion of the spherically rounded weld face surrounded by the innermost ringed protrusion.

9. The welding electrode set forth in claim 8, wherein each of the ringed protrusions has rounded corners when viewed in cross-section.

10. The welding electrode set forth in claim 8, wherein the welding electrode is formed of a copper alloy.

11. The welding electrode set forth in claim 8, wherein an amount of area of the spherically rounded weld face modified by the ringed protrusions is 50% or less of a contacting area of the spherically rounded weld face.

12. The welding electrode set forth in claim 8, wherein each of the ringed protrusions protrudes above the spherically rounded weld face to a height of at least 10 μm.

13. The welding electrode set forth in claim 8, wherein three or more ringed protrusions are included on the spherically rounded weld face.

14. The welding electrode set forth in claim 11, wherein the amount of area of the spherically rounded weld face modified by the ringed protrusions is 20% or less of a contacting area of the spherically rounded weld face.

15. A welding electrode comprising: a body of the welding electrode, which welding electrode forms electrical resistance spot welds in an assembly of overlying metal workpieces that comprises at least one aluminum alloy workpiece, the body having an end; a convex weld face supported at the end of the body; and ringed protrusions that project outwardly from the convex weld face and are positioned to make contact with and indent into a surface of the aluminum alloy workpiece when the convex weld face of the welding electrode is brought into contact with the assembly of overlying sheet metal workpieces during a resistance spot welding operation, the ringed protrusions being radially separated from one another by portions of the convex weld face and each of the ringed protrusions having a circumference that surrounds a center of the convex weld face, wherein an amount of area of the convex weld face modified by the ringed protrusions is 50% or less of a contacting area of the convex weld face, and wherein an innermost ringed protrusion of the ringed protrusions rises to a height above a portion of the convex weld face surrounded by the innermost ringed protrusion.

16. The welding electrode set forth in claim 15, wherein each of the ringed protrusions has rounded corners when viewed in cross-section.

17. The welding electrode set forth in claim 15, wherein the amount of area of the convex weld face modified by the ringed protrusions is 20% or less of a contacting area of the convex weld face.

18. The welding electrode set forth in claim 15, wherein the convex weld face is spherically rounded and has a radius of curvature between 20 mm and 50 mm.

19. The welding electrode set forth in claim 15, wherein each of the ringed protrusions protrude above the convex weld face to a height of at least 10 µm.

20. The welding electrode set forth in claim 18, wherein the ringed protrusions concentrically surround the center of the spherically rounded weld face and are separated by concentric circular sloped portions of the spherically rounded weld face.

* * * * *